US005862612A

United States Patent [19]

Bielfeldt

[11] Patent Number: 5,862,612

[45] Date of Patent: Jan. 26, 1999

[54] METHOD AND SYSTEM FOR DEWATERING CARBONIFEROUS MATERIALS USING A VAPORTIGHT PRESSURE CHAMBER

[75] Inventor: Friedrich B. Bielfeldt, Paehl, Germany

[73] Assignee: Maschinenfabrik J. Dieffenbacher GmbH & Co., Eppingen, Germany

[21] Appl. No.: 717,942

[22] Filed: Sep. 23, 1996

[30] Foreign Application Priority Data

Sep. 22, 1995 [DE] Germany ........................ 195 35 315.3

[51] Int. Cl.[6] .............................. F26B 5/14; B01D 37/00; B01D 33/04

[52] U.S. Cl. ................................ 34/398; 34/507; 34/519; 210/770; 210/783

[58] Field of Search ............................ 34/398, 507, 519; 210/770, 771, 783

[56] References Cited

U.S. PATENT DOCUMENTS

| | | | |
|---|---|---|---|
| Re. 35,091 | 11/1995 | Bergloff et al. | 210/783 X |
| 4,127,487 | 11/1978 | Havalda | 210/350 |
| 4,402,834 | 9/1983 | Bastgen et al. | 210/770 X |
| 4,475,453 | 10/1984 | Davis | 210/783 X |
| 4,477,358 | 10/1984 | Heintges et al. | 210/783 |
| 4,702,745 | 10/1987 | Kamei et al. | 44/10 |
| 4,792,406 | 12/1988 | Allenson et al. | 210/783 X |
| 4,961,862 | 10/1990 | Janecek | 210/783 X |
| 5,196,090 | 3/1993 | Corbellini et al. | 210/783 X |
| 5,202,034 | 4/1993 | Martel, Jr. | 210/770 |
| 5,259,952 | 11/1993 | Lee | 210/770 X |
| 5,545,333 | 8/1996 | Louden et al. | 210/770 X |
| 5,571,404 | 11/1996 | Derenthal | 210/783 X |

FOREIGN PATENT DOCUMENTS

| | | | |
|---|---|---|---|
| 699803 | 12/1964 | Canada | 34/519 |
| 339034 | 5/1915 | Germany . | |
| 334903 | 3/1919 | Germany . | |
| 359440 | 4/1920 | Germany . | |
| 472419 | 10/1926 | Germany . | |
| 1080970 | 5/1960 | Germany . | |
| 3519530 | 2/1986 | Germany . | |
| 3932099 | 10/1990 | Germany . | |
| 4224648 | 4/1993 | Germany . | |
| 4434447 | 3/1996 | Germany . | |
| 228602 | 12/1943 | Switzerland . | |
| 7997438 | 10/1956 | United Kingdom . | |
| WO 96/10064 | 4/1996 | WIPO . | |
| WO 9612923 | 5/1996 | WIPO . | |

*Primary Examiner*—Christopher B. Kilner
*Attorney, Agent, or Firm*—Foley & Lardner

[57] ABSTRACT

Water content which is bound by capillarity in fiber cells of carboniferous materials is reduced by a thermomechanical dewatering process. In the process, the carboniferous materials are conveyed by a dispersion box into a pressure chamber including upper and lower plates. Steam is applied to the materials introduced into the pressure chamber from both the upper and lower plates to heat the materials up to about 125° C. and to release the water which is bound by capillarity in the fiber cells. Initially, the pressure within the chamber is maintained at no greater than the steam pressure. Subsequently, the pressure chamber is sealed gastight and the carboniferous materials in the pressure chamber are pressed using the upper and lower plates.

36 Claims, 12 Drawing Sheets

METHOD AND SYSTEM FOR DEWATERING CARBONIFEROUS MATERIALS USING A VAPORTIGHT PRESSURE CHAMBER

BACKGROUND OF THE INVENTION

1. Field of the Invention

The invention relates to a system and a process for reducing the water content of pulverized solid carboniferous materials and/or sludges, especially raw lignite. The water content is typically bound by capillarity in the fiber cells of the input material to be dewatered and is removed through the effects of thermal energy and pressure. The thermal energy consists of superheated water vapor and mechanical energy, both of which are supplied and exerted as surface pressure on the input material.

2. Description of the Related Art

A process and a device for dewatering carboniferous materials are disclosed in DE-PS 359 440, DE-PS 334 903 and DE-PS 339 034. These references describe a process and a device for dewatering peat and similar materials. The material to be dewatered is prepressed in thin vertical layers in circular cylindrical shafts, and after removal of the pressure, is exposed without pressure to the effects of high-pressure steam before undergoing a final pressing. Of special importance is the stage in the process during which the prepressed material is exposed to steam. Before the prepressed material which is contained in the circular cylindrical shaft and bounded by a ring-shaped pressure piston, is exposed to steam, the withdrawal of the piston creates so much space that the material can be stretched within its circular shaft, thus permitting the pressed cake to be broken up by lateral effect of the steam. Because the pressed cake breaks up, the high-pressure steam supplied in any given stage of the process can easily find its way through the input material and freely press away the loosened material so that channels can be formed through which large quantities of the steam pour with only limited effect on the material without purposeful condensation of the steam on all sides of the surface of the partially pulverized input material. By pre-pressing the material while it is in a cold state, the water, which can be squeezed out while cold, is extracted from the material. In peat, this water is present mainly as large quantities of surface water. Preheating of the input material with the large quantities of water which is not colloidally bound would be completely uneconomical in terms of energy and processing technology.

On the other hand, lignite contains only water which is colloidally bound, that is, water which is bound in the fiber cells by capillarity. Lignite has a water content of up to approximately 60 percent by weight. When this lignite is burnt in power plants, either a considerable proportion of the lignite input must be expended directly, or an adequate quantity of heat from the combustion gases must be used to vaporize the water. This proportion can be up to 22 percent by weight depending on the water content. This loss of energy can be reduced only if the water content of the raw lignite is reduced, before combustion, in an efficient drying or dewatering process.

The process, described in DE-PS 359 440, for releasing free surface water by prior dewatering under pressure is unnecessary with raw lignite. An additional disadvantage of such a process is the absence of control over steaming without pressure, and as a result, an adequate dewatering does not occur during the final pressing.

The devices in DE-PS 334 903 and DE-PS 339 034 for executing the process described in DE-PS 359 440 are, with regard to supplying of input material and emptying out of the dewatered and pressed input material, completely unsuitable for continuous throughput of large quantities, which is required for example for a power plant, and are therefore uneconomical. Steaming of the input material while it is being lightly precompressed within a range of steam pressure of 5 bar to 8 bar, for example, for uniform flowthrough of the pulverized raw lignite would not be possible in these devices, because the circular piston is not sealed off at the porous side walls and the tangential stretching due to the internal pressure creates an unacceptable gap between the circular piston and the inner walls of the cylinder. As a consequence, a substantial portion of the steam is lost and dewatering of only a limited amount is possible. This means that the use of such a variant of the process would be uneconomical with these devices.

Difficulties with using known processes for reducing the water content of lignite in large power plants are due to the fact that, as a consequence of the necessarily high throughput of lignite, the cost of equipment becomes very high when, for example, autoclaves are used in accordance with the Fleissner process with expensive pressure sluices, fans, and high pressure pumps. The use of this process for thermal dewatering has so far not produced any commercial successes, although the specific consumption of energy is lower in comparison with thermal drying. In order to ensure that a power plant will have a throughput of large quantities of input material to be dewatered, it is necessary to use large-surface filter presses with the greatest possible piling heights, for example about 500 mm, of the input material which is sprinkled in beds. This is also true for continuously operating double belt presses, which are disclosed in DE-PS 472 419.

With regard to the great piling heights, the use of a pressing system open at the sides is unsuitable when the compression ratio of the granulated raw lignite to the dewatered pressed lignite is 3:1 and the piling angle is approximately 32°, because of the large losses occurring at the edges. This is especially true during the steam supply segment of the process. This becomes still more critical for solid carboniferous materials with a more or less colloidally bound water content exceeding 65 percent by weight as, for example, in the case of plastically flowing sludges with a water content of approximately 75 percent by weight.

Sidewalls and bulkheads have been arranged as disclosed in DE-PS 472 419 for dewatering raw peat, in an attempt to stabilize the plastic flow consistency of the bulk flow inside the press by means of swinging vertical plates. However, the system in accordance with this reference does not provide for a controlled supply of steam into the total body of pressed material and its design is not suitable for this purpose.

SUMMARY OF THE INVENTION

An object of this invention is to provide a process and system which use thermomechanical dewatering and which make large-scale industrial utilization of raw lignite possible. The overall efficiency of the flow throughput in power plant processes is improved with the process and system according to the invention, so that the required continuous throughput of large quantities of carboniferous solids is achieved.

The above and other objects of the invention are accomplished with a thermomechanical dewatering system which includes a belt having a lower belt, two sidewall belts, and a pair of sealing strips which couples the sidewall belts to the lower belt and a gastight pressure chamber to which the materials to be dewatered are supplied by the belt. The pressure chamber includes a lower plate on top of which the lower belt slides, lateral pressure strips against which the two sidewall belts slide, a sleeve regulating a flow of materials entering the chamber, a valve regulating a flow of the materials exiting the chamber, and an upper plate disposed between the lateral pressure strips. The pressure chamber prevents the steam pressure from causing a blowout at the edges of the mat of bulk material and to achieve a uniform distribution of thermal energy over the pressure surfaces without reducing the steam pressure at the edges.

According to the invention, it becomes possible to dewater lignite economically with a small expenditure of thermal and mechanical energy. For the purpose of flow throughput of lignite at high humidity, the overall efficiency of the power plant process can be definitely improved by the use of the system according to the invention, which is advantageous in terms of energy, for removing the water. Moreover, in comparison to the known thermal drying processes, there is a saving of energy for vaporizing the water.

Furthermore, depending on the granular size of the raw lignite prior to fractionation, which may be from 2 to 20 mm and whose percentage composition of fractions produces another piling structure of the input material and therefore a different heat transfer, the quantity of heat absorbed by the input material can vary along a large temperature range, e.g., between approximately 15° C. and 40° C. starting from a room temperature of 20° C. The heat transfer to the bulk lignite is necessarily given, in particular, by the contact surfaces of the lower dispersion belt and the lateral steel belts in the dispersion area A, which are heated to over 100° C., the bulk material having already acquired a higher temperature through preheating in the delivery belt and in the distributor rollers and, on the reverse stroke of the dispersion machine, being dispersed in a number of thin layers until the dispersed material reaches the height H. Due to the extensive injection steaming on both sides, the injection steaming temperature of greater than or equal to 150° C. need be only slightly exceeded, because, in the center of the bulk input material (at H/2 which is less than or equal to 250 mm), the decreasing steam temperature is sufficient to heat even the bulk material located in the center to over 100° C. in the core of the granular lignite.

By compressing the input material, preferably isochore, to a maximum approximately equal to the injection steaming pressure, a uniform flowthrough of the steam with isobaric pressure distribution necessarily occurs in the intervening spaces of the granulated bulk material. Because of the resistance to flowthrough attaining at least H/2 depending on the varying structure of the bulk material described above, the steam pressure must be in the range of 5 bar to 8 bar.

To release the water bound by capillarity in the fiber cells, the temperature in the core of the granular lignite must, with a granular size of approximately 2 to 20 mm for example, reach a temperature greater than 100° C. in order to burst the capillaries and pores in the fiber cells in which the water is bound. In other words, the granular material must have attained a surface temperature of at least between 100° C. and 150° C., e.g., about 125° C., so that afterwards, when the pressure in the pressure chamber has been raised, the water is squeezed out rapidly, resulting in a reduction to a residual water content of up to 20 percent by weight, the pressing pressure up to a maximum of 75 bar being determined by the piling height of H=500 mm, the size of the grain of the granular material, and its percentage composition.

The extensive injection steaming of the steam in a completely enclosed space makes it possible to have an optimum flowthrough of the granulated lignite with thermal energy, in which the isochore compressive pressure on the bulk material in the pressure chamber must be greater than the density of the bulk material but, because of the required permeability, may not be substantially greater than the steam pressure.

Additional advantages of the invention are as follows. Over the entire pressure surface of the input material, there is a uniform injection steaming of the steam on both sides above and below. This makes it possible to have a relatively a large piling height with the economic advantage of a throughput of large quantities per unit of time, because the steam from either side only has to flow through half the piling height H. At the same time, the dispersal in a dispersion box belt system, which is endlessly revolving through the press, prevents a loss of steam energy through blowouts and consequent decrease in steam pressure, because disturbing influences due to the piling angle are excluded. In consequence, even semi-pasty masses, for example, sludges, can be safely processed.

Because of the sluice system of the revolving dispersion box belt system, using the gate valve and the blade (or sleeve) respectively at the exit and entrance of the pressure chamber, not only is use made of the technical advantage of a gastight closed steam pressure chamber, but it becomes possible, by opening and closing the sluices in a phased operation of the filter press, to have an almost continuous operation of the device with a utilization of the complete device conditioned by the dispersion box belt system. Such a system is advantageous and simple in terms of apparatus and space economy.

The preheating of the revolving dispersion box belt system in front of the pressure chamber creates a preheating of the dispersed bulk flow of the granular lignite which is advantageous in terms of energy and prevents unnecessary losses due to condensation in the dispersion box belt system during the injection steaming, so that the thermal energy is completely transferred to the input material. In addition, the heat given off from the dewatering process can be economically used for the preheating.

The woven metal belts are designed in an advantageous manner to be mobile below as a dispersion machine belt and fixed above on the upper pressure plate. The belts not only filter out the escaping coal water over a broad surface on the upper and lower side, but also provide an effective surface distribution of the steam during the injection steaming. Because of the advantageous arrangement of the device, the woven metal belts are automatically cleaned of coal residues, for example, by the injected steam. Blocked drain holes are cleaned on both sides by the switchover to steam rinsing. Surface suction over the dewatering system located above and below, halves the number of dewatering channels in the granular lignite, and this further shortens the times for squeezing out the coal and condensation water.

Consequently, the advantage of the process to which the invention relates is that each bulk flow particle, distributed over the surface in beds, is uniformly supplied with thermal energy by superheated water vapor under optimum conditions of permeability, and that, from the input material which is uniformly heated in sequence, the water is extracted over the surface under high pressure, while the input material is supplied to the press in beds. The thermomechanical dewatering processes and the transport of the dewatered pressed material out of the press take place in a continuous phased succession, so that overall large bulk flow can be dewatered in a series of completely controllable stages with an almost continuous throughput of quantities.

A system and a press for carrying out the stages in the process are described in the claims. A revolving dispersion machine belt is led through a pressure chamber integrated into a single-story press and this pressure chamber is opened and closed by a sluice system in the sequence of phases of the process.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

The invention is described in detail herein with reference to the drawings in which.

DETAILED DESCRIPTION OF THE PREFERRED EMBODIMENT

Figures 1, 2:
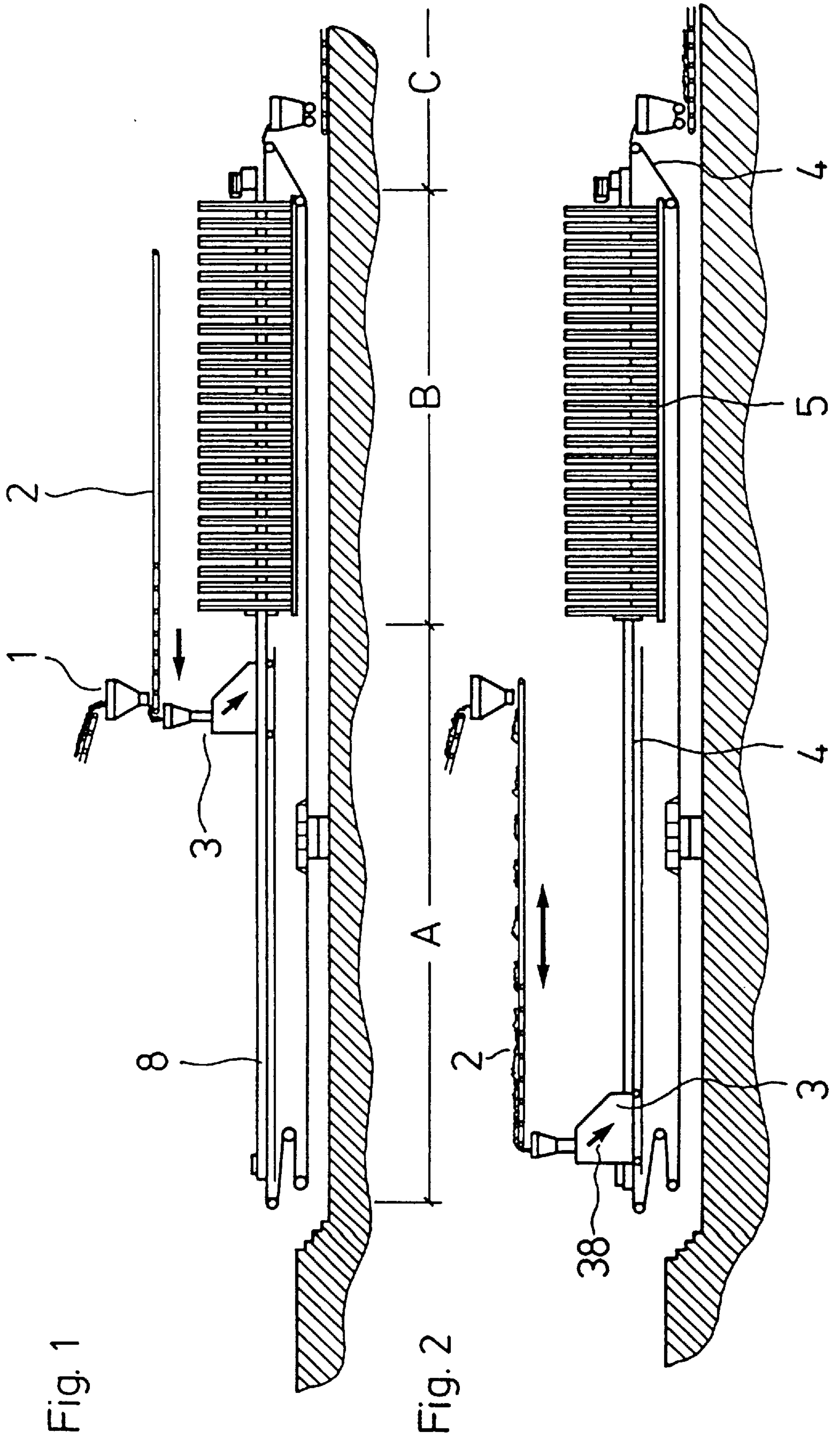
FIGS. 1 and 2 are schematic elevation views of the dewatering system according to the invention.
Figure 3:
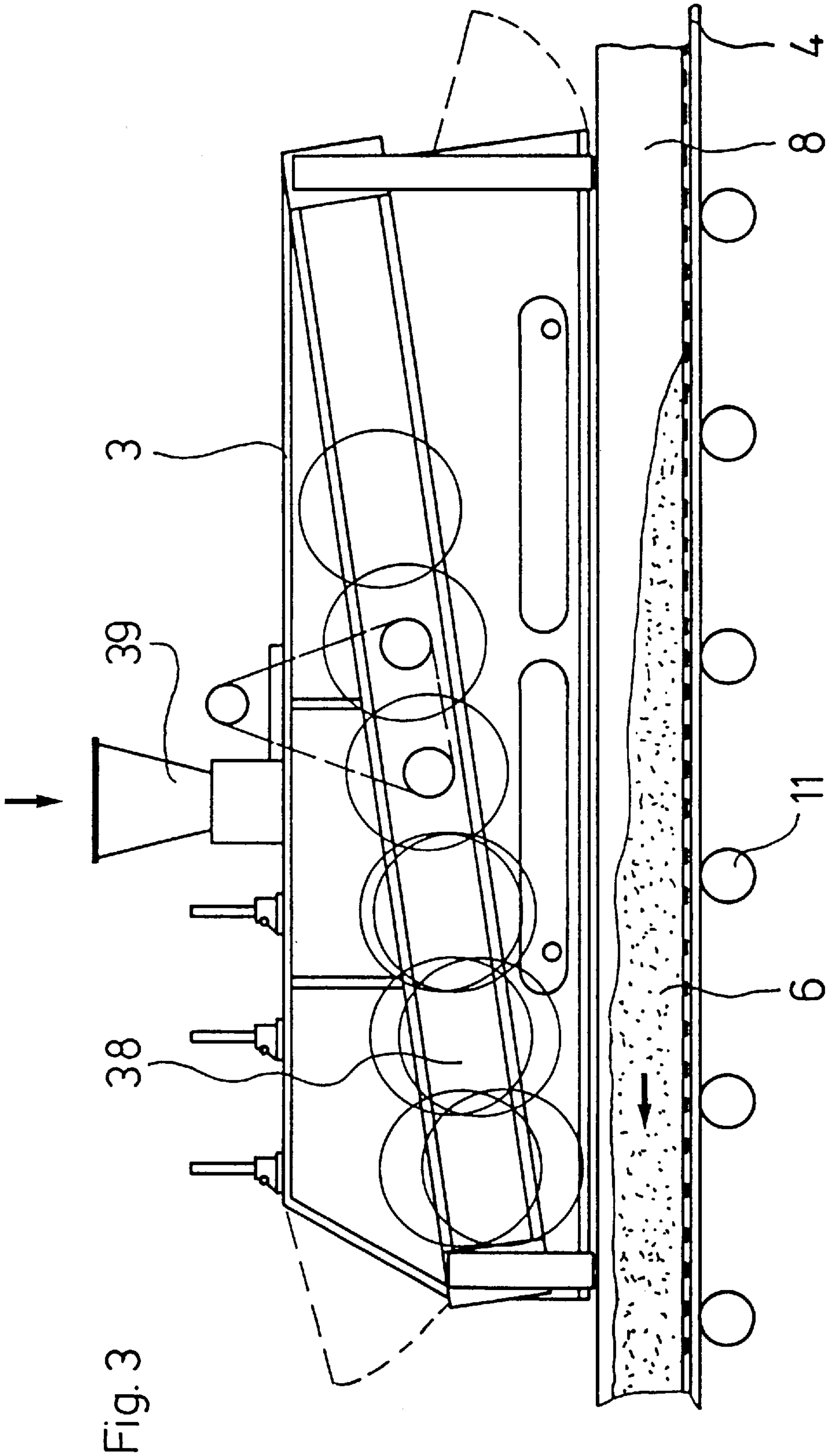
FIG. 3 is an enlarged view of the dispersion machine.
Figure 4:
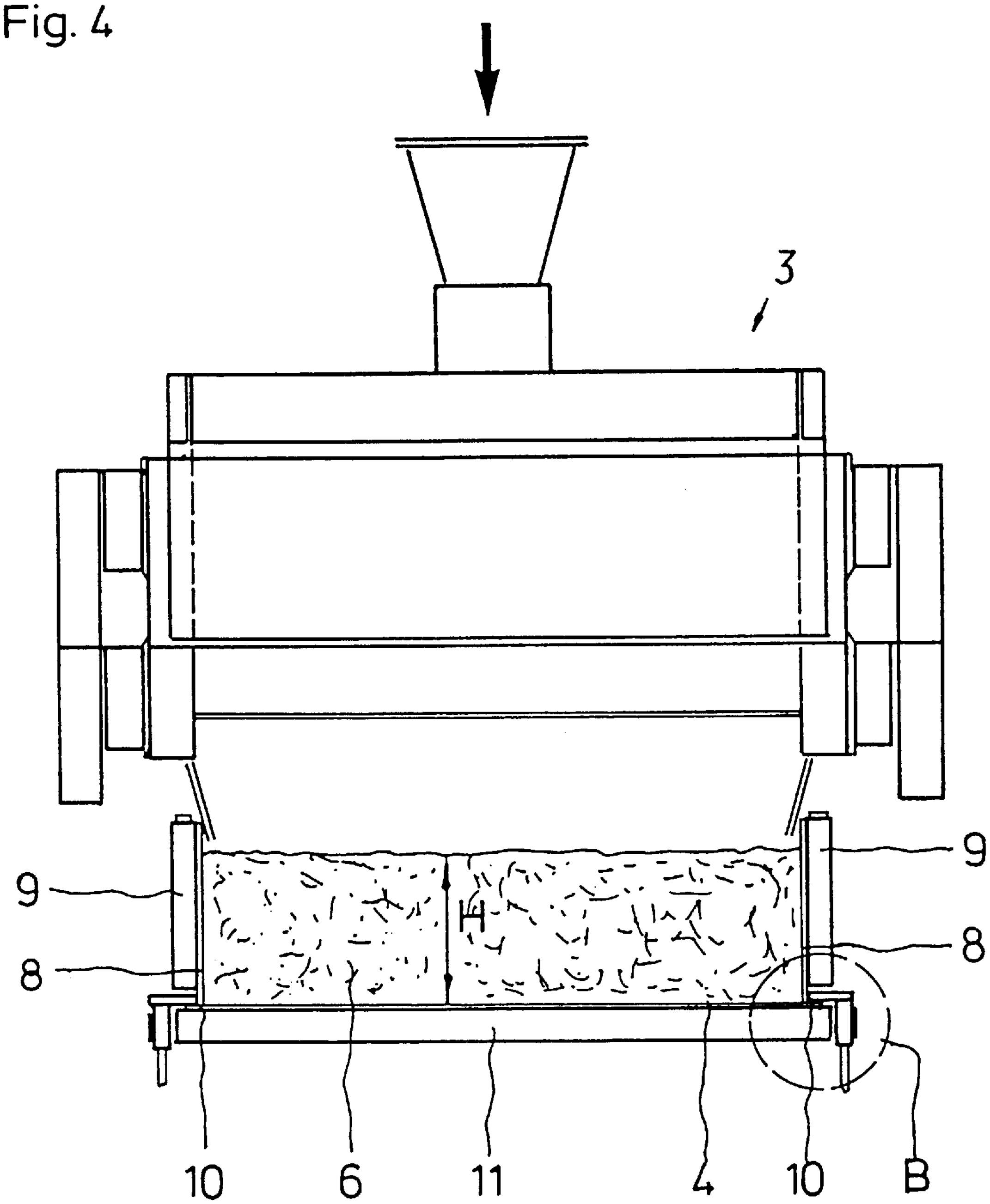
FIG. 4 is a front view of the dispersion machine.
Figure 6:
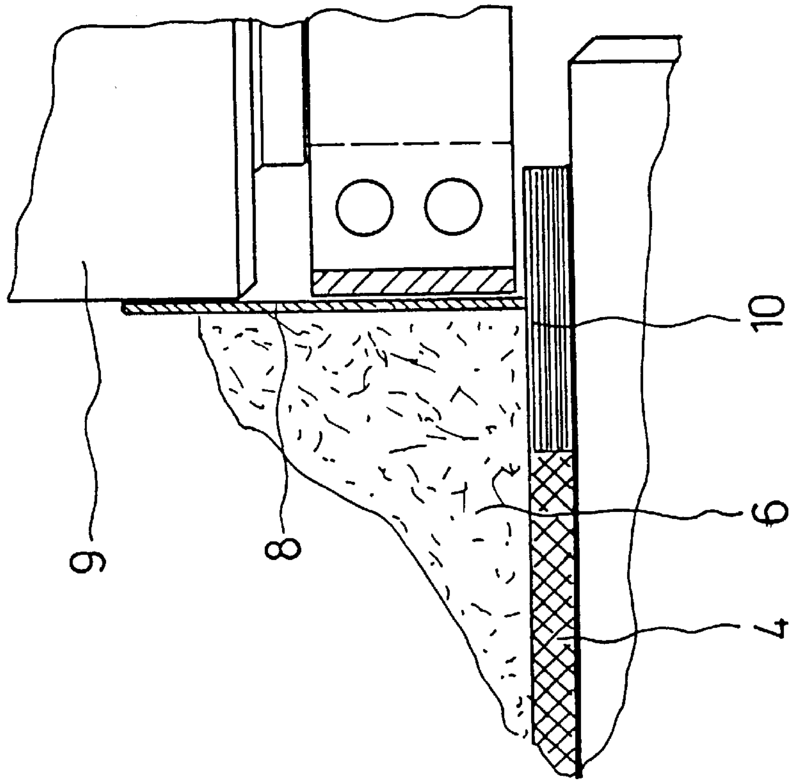
FIG. 6 is an enlarged view of region B indicated in FIG. 4.
Figure 5A:
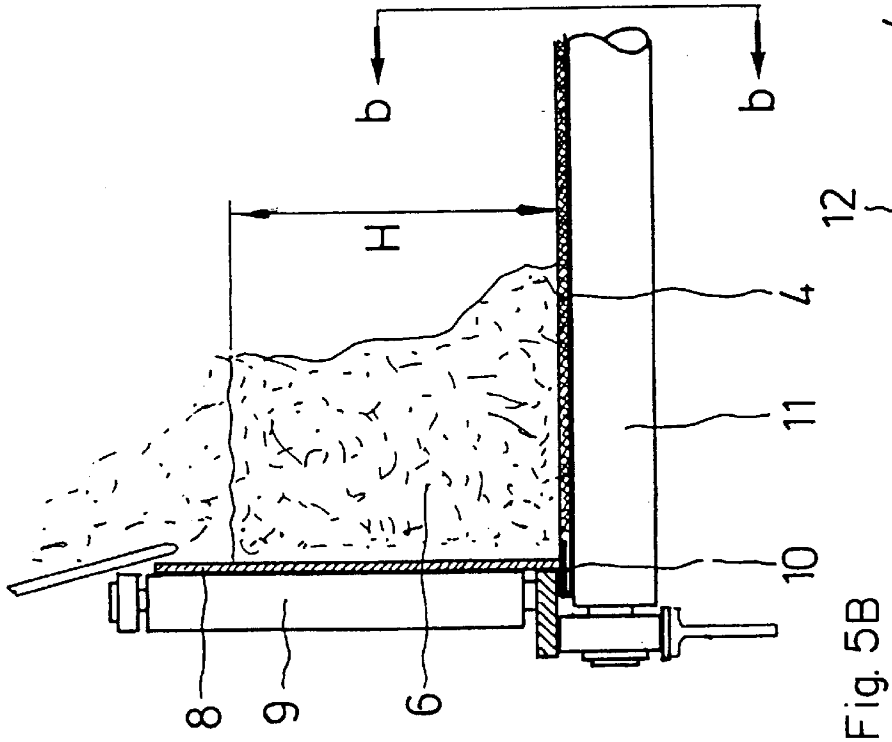
FIG. 5A is an enlarged front view of the dispersion belt.
Figure 5B:
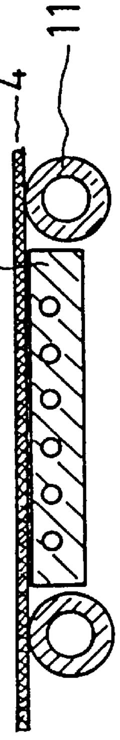
FIG. 5B is a sectional view taken along line VB—VB of FIG. 5A.

FIGS. 1 and 2 illustrate a thermomechanical dewatering system according to the invention designed, for example, for dewatering raw lignite with a water content of approximately 60 percent by weight and including the following segments:

A A dispersion segment for continuous dispersal of the granular lignite into beds in a revolving dispersion box belt system;

B A single-stage filter press with an integrated pressure chamber and sluice system; and C An exit segment or an outward transport of the coal slab from the pressure chamber with prior pulverization for subsequent mill drying. The dispersion segment A in FIGS. 1 and 2 shows the continuous delivery of the fractionated raw lignite from a fixed bunker system 1 to a horizontally reversible delivery belt 2. A reversible dispersion machine 3 (detailed side view illustrated in FIG. 3) disperses the granular lignite 6 on to a dispersion belt 4, which is led through a filter press 5. In FIG. 4, a front view of the roller mill of the dispersion machine 3 is shown. The roller mill disperses the granular lignite 6 into the dispersion box belt system which consists of a lower endless dispersion machine belt 4 and two endless vertical sidewall steel belts 8 which are impermeable to gas and positioned to the left and right of the lower dispersion belt 4. The lower dispersion belt 4 takes the form of a woven metal belt permeable to steam, but is, on each of its outer edge 10 on which the two vertical steel belts 8 respectively stand, sealed gastight, for example, with metal or heat-resistant plastic.

Figure 7:
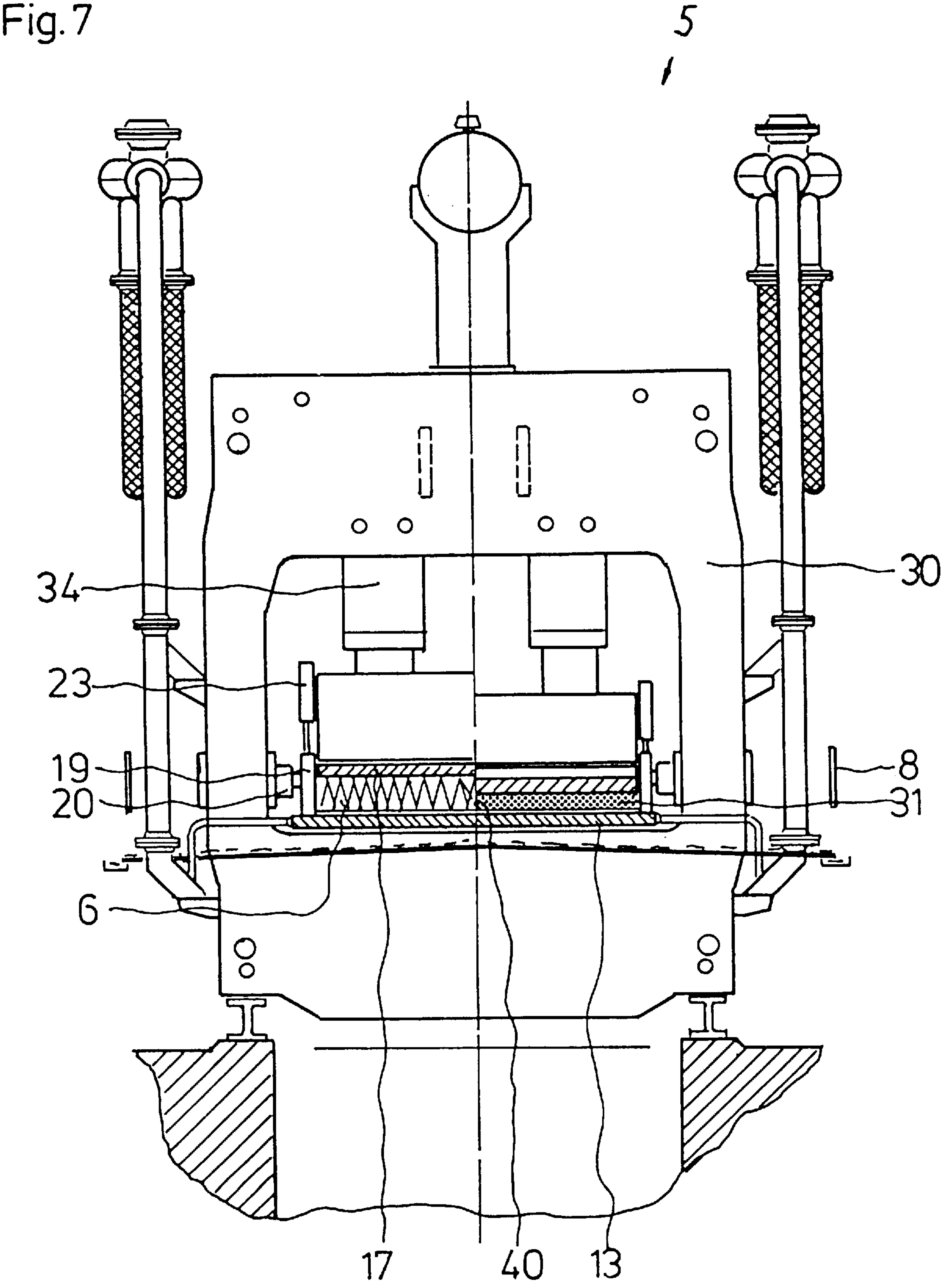
FIG. 7 is a front sectional view of the system according to the invention.
Figure 8:
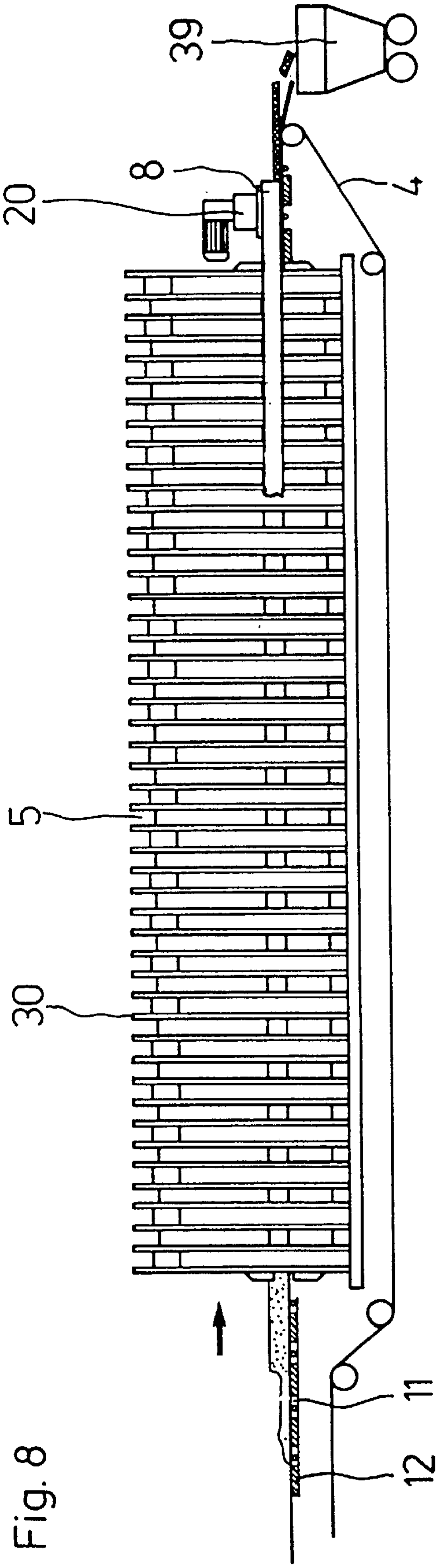
FIG. 8 is an enlarged view of FIG. 1 and illustrates the filter pressing segment.
Figure 9:
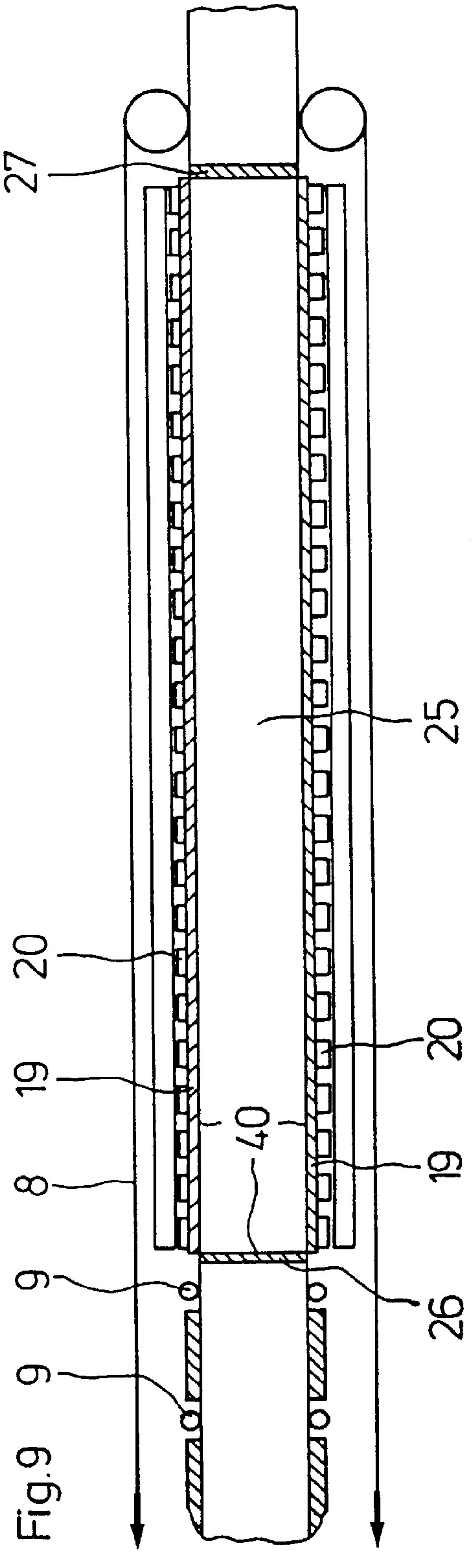
FIG. 9 is a plan view of FIG. 8.
Figure 10:
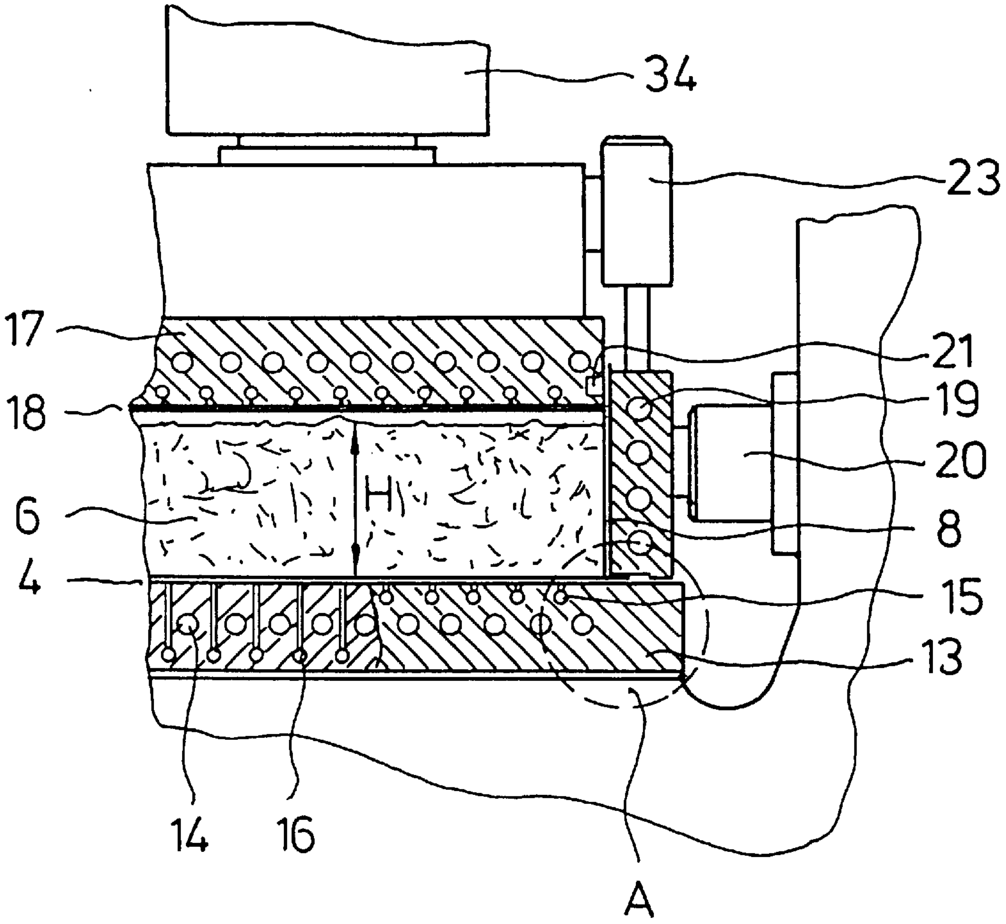
FIG. 10 is a sectional view, taken along line X—X of FIG. 15, of the filter pressing segment.
Figure 13:
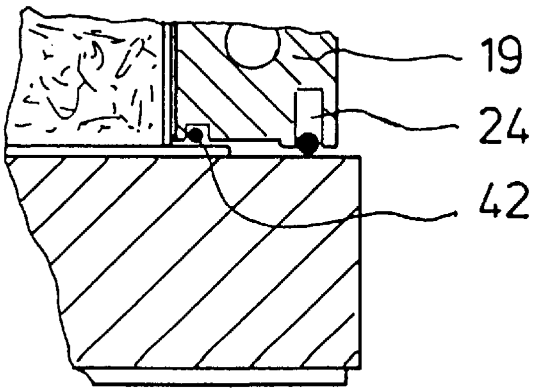
FIG. 13 is an enlarged view of the region A indicated in FIG. 10.

After dispersion, the dispersion box belt system is led through a pressure chamber 40 synchronously. The dispersed granular lignite in a geometrically exact rectangular cross-section is dispersed up to a height H (see FIG. 4) of the dispersion machine 3 and is conveyed unchanged into the pressure chamber 40 as shown in FIGS. 7 and 10. By slightly inclining the vertical support rollers 9 against which the vertical steel belts 8 slide, the vertical steel belts 8 are pressed tight against the sealing strips 10. The lower dispersion belt 4 slides on horizontally disposed support rollers or idler rollers 11 and heat conduction plates 12, so that along the dispersion machine segment A the dispersion box belt system, shown in detail in FIGS. 8 and 9, is preheated to over 100° C., so that later in the pressure chamber 40 no condensation heat is needlessly extracted from the steam during the steam-finishing stage. At the same time, the heated steel belts 4 and 8 serve to preheat the granular lignite 6 in the dispersion machine segment A to approximately 60° C. before entering the heatable filter press 5. Similarly, the delivery belt 2 can be heated, so that the granular lignite 6 which is dispersed in one or more layers into beds into the dispersion box belt system can be heated in advance. In addition, the distributor rollers 38 of the dispersion machine 3 for the transverse distribution of the granular lignite may be heated.

The filter press 5 with integrated pressure chamber and sluice system in the segment B is, as shown in FIGS. 7, 8 and 9, designed as a stationary single-stage overhead piston press. The dispersion box belt system travels endlessly from the dispersion segment A into the pressure chamber area B. In segment B, the lower woven metal belt 4 slides over the lower fixed and heated steam injection and dewatering plate 13 of the pressure chamber 40. The central holes 14 in the pressure plate 13 make the heating possible, and the heat given off from the dewatering process can be advantageously used for this purpose. The steam injection or inlet holes 15 are distributed uniformly over the press or filtering surface, approximately 90 mm apart within a grid, and are placed close to the underside of the press. The woven metal belt 4 with a mesh width of approximately 0.5 mm ensures good surface steam distribution. The drain holes 16, similarly distributed over the surface of the press at distances of approximately 90 mm, are combined into collector holes on the reverse side of the press surfaces to catch the capillary water released after the steam injection.

The upper woven metal belt 18 is coupled positively to and below the upper pressure plate 17 for use as a steam distributor and filter fabric or sieve. Cleaning of the filter fabric is performed automatically in the area of the steam jets by the steam pressure of approximately 6 to 8 bar. In the area of the water collecting openings 16, cleaning is performed, when necessary, by an externally located switchvalve, which is switched from drainage water suction to steam rinsing, The pressure chamber system (in area B) is shown in FIGS. 7 to 13. To make it possible for all bulk flow particles of the granular lignite fed into the filter press 5 by the dispersion box belt system to be uniformly rinsed with steam the bulk flow, the loosely bulk granular lignite 6 is closed in on all sides and sealed steamtight to a high degree. Aggregation takes place in the pressure chamber 40. The pressure chamber 40 consists of the following functional components:

- the lower, stationary pressure plate 13 located in press frame 30;
- the vertical lateral pressure strips 19, placed respectively left and right on the longitudinal sides of the pressure plate 13, these strips being pressed over hydraulic short-stroke cylinders 20 laterally against the upper pressure plate 17 driven by the hydraulic press cylinders 34;
- the long-stroke cylinders 34 operating vertically from above and the short-stroke cylinders 20 pressing horizontally on the pressure chamber 40 from the sides; the cylinders 34 and 20 are each assigned to one of the press frames 30 which enclose the pressure chamber 40 over the entire length of the pressure surface.

The vertical steel belts 8, which with the lower dispersion machine belt 4 are designed as dispersion boxes, are led synchronously by drum drives together with the lower dispersion machine belt 4 through the pressure chamber 40. The vertical steel belts 8 slide along the smooth inner surface of the lateral pressure strips 19 and the smooth exterior surfaces of the upper pressure plate 17 as the material to be pressed moves in and out. The lateral pressure strips 19 are guided by the short-stroke cylinder 20 in lateral pressure, are unloaded during the transporting movement of the steel belts 4 and 8, and are subject to variable lateral pressures against the upper pressure plate 17 during steam injection and the pressing stage. The pressure plate 17 is sealed against the steam pressure by a gastight elastic rubber gasket 21. The lateral pressure strips 19 are in turn sealed gastight against the sealed lower edge 10 with elastic rubber gaskets 42, if the lateral pressure strips 19 are pressed down vertically by the hydraulic pressure cylinder 23 when the steel band 4 is not in motion. When the lateral pressure strips 19 are unloaded, they are freed by means of pressure springs 24 for the free running of the dispersion belt.

The entry and exit sluices 26 and 27 in the pressure chamber system are shown in FIGS. 14 to 18. On the short sides of the press surface rectangle 25 (shown in FIG. 9) placed along the line of travel, a gate valve 28 and a blade 22 can be introduced from above by hydraulic slides 36 and 37. The gate valve 28 has, in turn, a gastight elastic rubber seal 29 against the front side of the upper pressure plate 17. The gate valve 28 is also protected positively from the pressed and dewatered coal slab 31 and the two vertical steel bands 8 with the lateral pressure strips 19 supporting them by heat-resistant elastic rubber slabs 41, so that when the short-stroke cylinder 20 exerts hydraulic pressure, the hydraulic pressure from the cylinder 23 provides a gastight seal both laterally and against the coal slab 31. The horizontal thrusts resulting from the steam pressure and the pressing pressures during dewatering are cushioned by a supplementary hydraulic locking system 35.

Figures 16, 17:
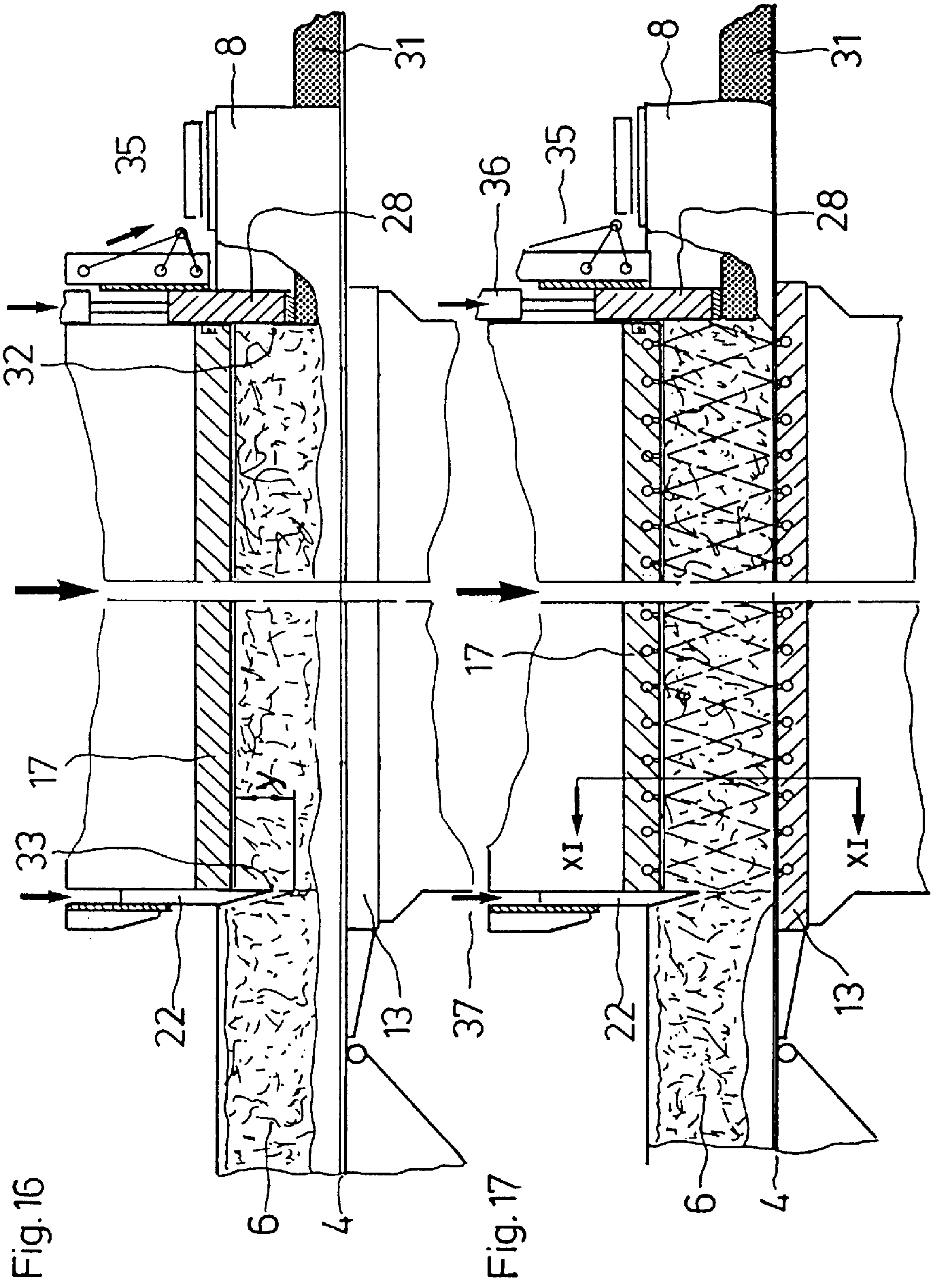
FIG. 16 shows the gastight closing of the pressure chamber in longitudinal section.
FIG. 17 shows the steam injection of the pressure chamber in longitudinal section.

At the entry 26, a blade 22 shown in FIG. 16, is sunk into the lignite 6 hydraulically between the two vertical steel belts 8. The dispersed bulk flow with the leading edge 32 is compressed in front of the press and travels up against the gate valve 28. The hydraulic cylinder 37 can be used to vary the depth of penetration y over the entire piling height H, so that when the granular lignite 6 is compressed below the blade edge 33, there is an adequate seal against the steam pressure during steam injection and a blowout of the dispersed bulk flow in front of the pressure chamber 40 is prevented. By means of the exterior lateral pressure strips 19, the blade 22 is clamped flexibly and laterally vapor-tight between the vertical steel belts 8 during steam injection. Like the lateral pressure strips 19, the gate valve 28 and the blade 22 are heated, so that during steam injection the thermal energy can be conveyed without heat loss to the granular lignite 6.

Figures 14, 15:
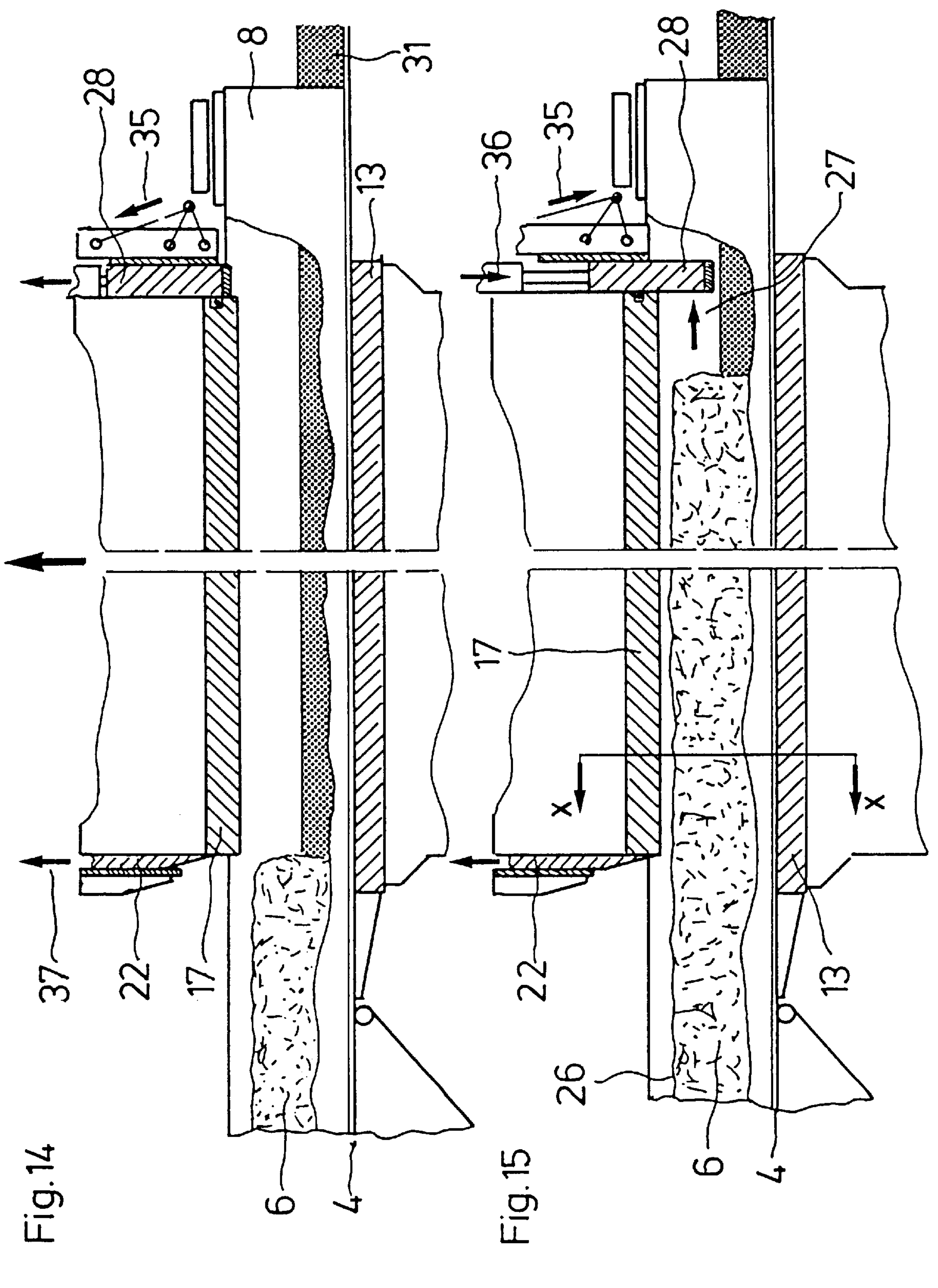
FIG. 14 shows the open pressure chamber in longitudinal section after pressing is finished.
FIG. 15 shows the loading of the input materials into the pressure chamber.

The series of steps in the process can be seen in FIGS. 11 to 19. The emptying and loading of the pressure chamber are shown in FIGS. 14, 15 and 16. FIG. 14 shows the open pressure chamber 40 in longitudinal section after pressing is finished. FIG. 15 shows the dispersion box belt system in motion for the loading into the pressure chamber 40. As is shown in FIG. 16, the pressed and dewatered coal slab 31 is carried out and the sprinkled bulk flow of granular lignite 6 is introduced. The gate valve 28 touches the upper side of the coal slab 31 shortly before the leading edge 32 reaches the position of the gate valve.

Steam injection takes place as in FIGS. 16, 17, 18 and 19. FIG. 16 shows the gastight closing of the pressure chamber 40 in longitudinal section. Here, the upper pressure plate 17 is being lowered by means of the hydraulic press cylinders 34 to a position just below the piling height H and is held preferably in this position so that the granular bulk is isochorically placed on all sides, i.e., compressed. The light compressive pressure on the granular lignite 6, at its maximum, is approximately as great as the subsequent steam pressure, so as to create an isobaric distribution of steam pressure in the intervening spaces of the granulated bulk material. Next, all the hydraulic slides 20, 23, 36, 35 and 37 of the lateral pressure strips 19 and of the gate valve 28 and the blade 22 are activated so as to make the pressure chamber 40 closed and gastight.

Figure 11:
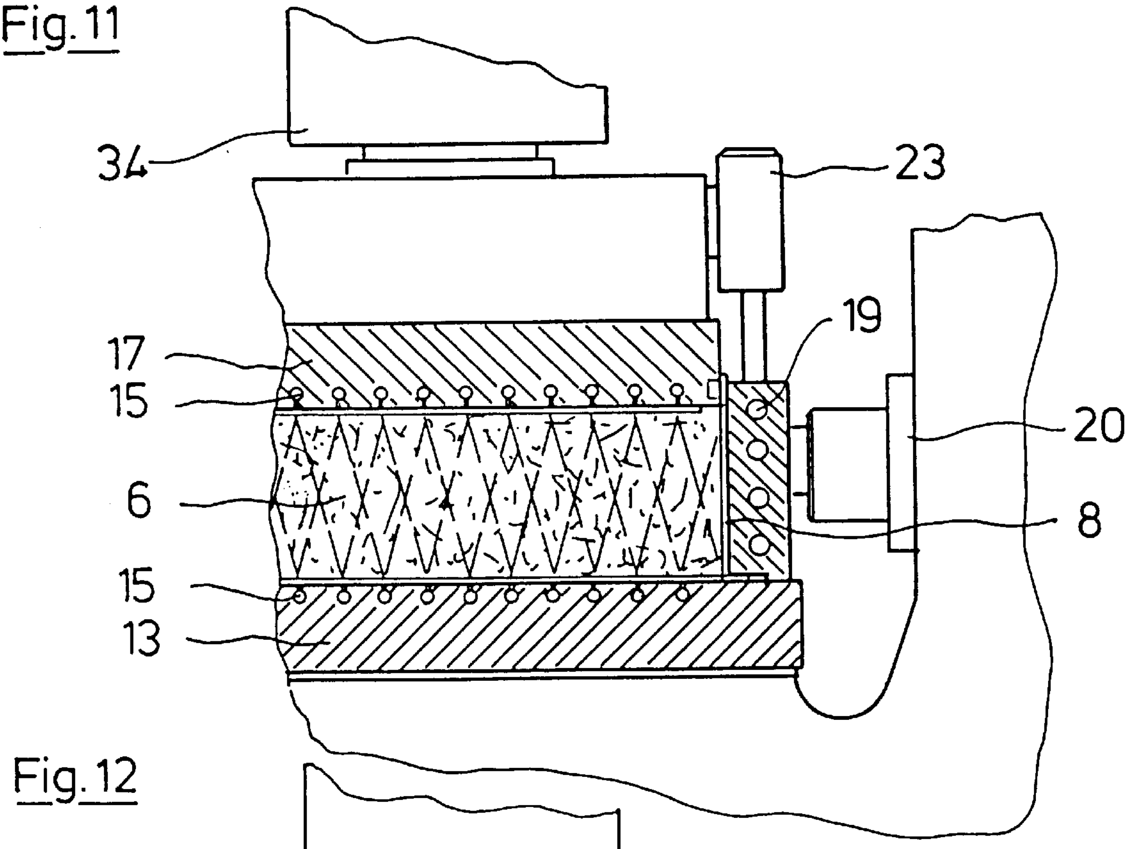
FIG. 11 is a sectional view, taken along line XI—XI of FIG. 17, of the filter pressing segment during the steam injection stage.

FIGS. 11 and 17 show diagrammatically that the hot steam from the upper pressure plate 17 and the lower pressure plate 13 is injected into the granular lignite 6. The hot steam may be injected simultaneously or alternately. After a quantity of steam required for the heat capacity has been introduced, the steam valves are closed and the pressing stage begins. Even before the steam valves are closed, the upper pressure plate 17 can be switched hydraulically from position setting to pressure control at the initial low hydraulic pressure.

Figure 12:
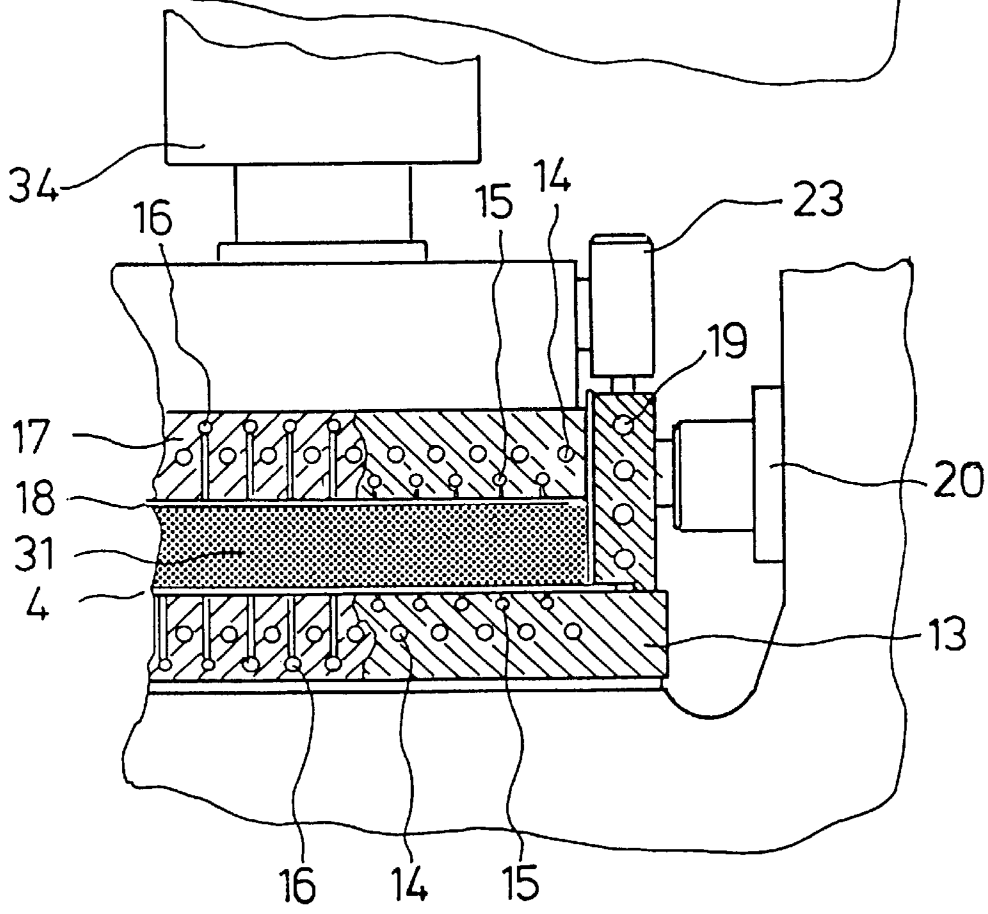
FIG. 12 is a sectional view, taken along line XII—XII of FIG. 18, of the filter pressing segment during the pressing stage.
Figure 18:
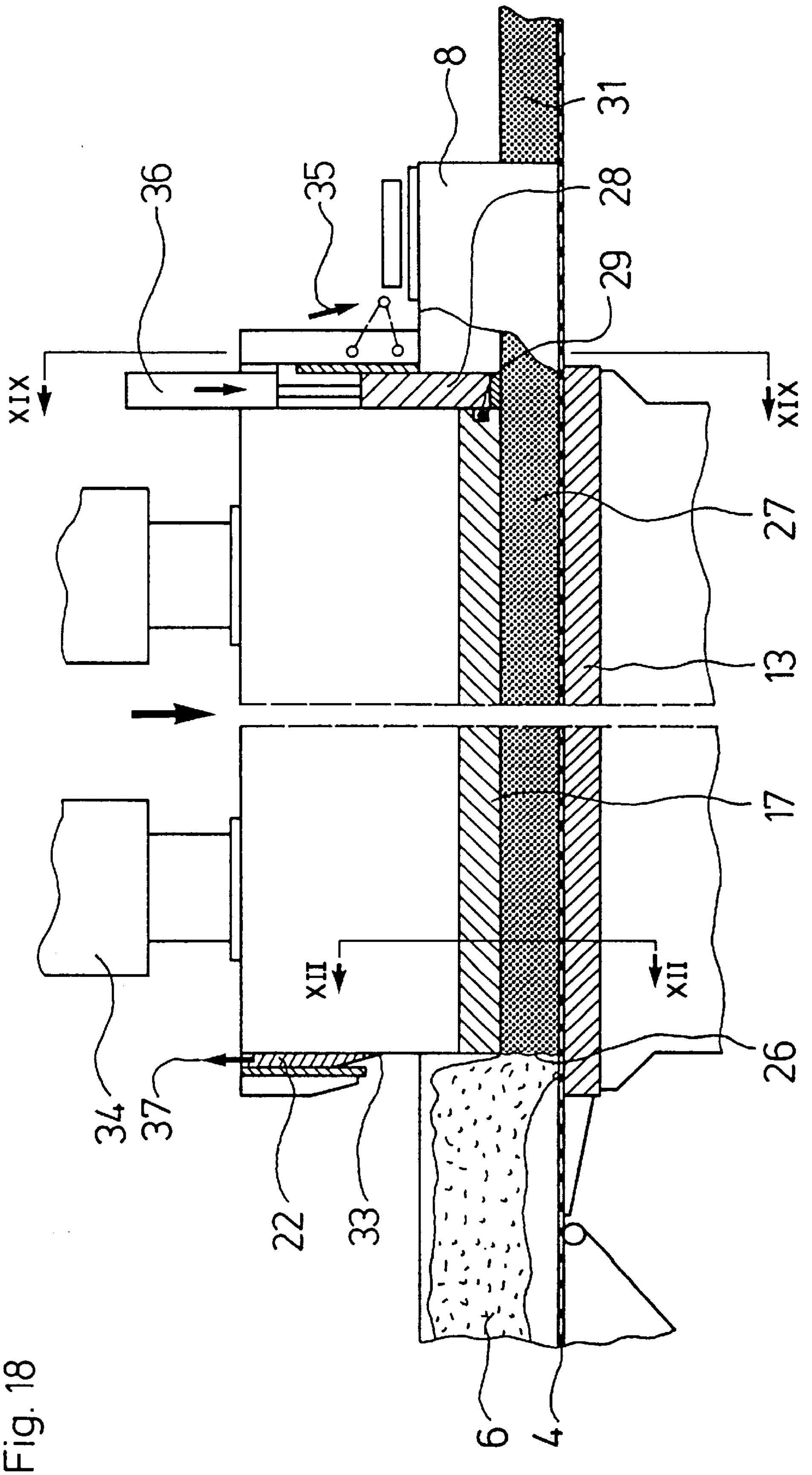
FIG. 18 shows the open pressure chamber in longitudinal section after pressing is finished.
Figure 19:
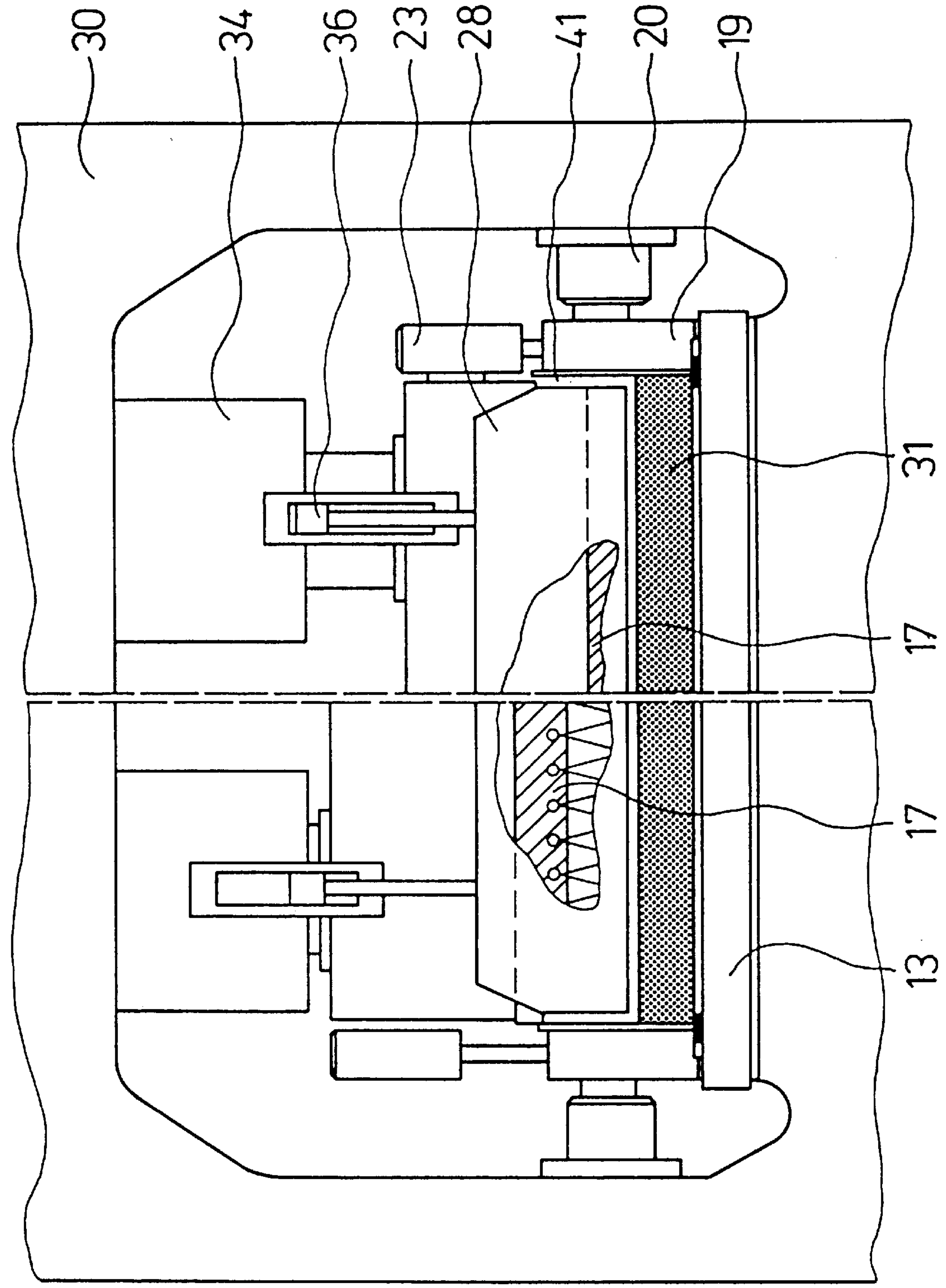
FIG. 19 is a sectional view taken along line XIX—XIX of FIG. 18.

Mechanical dewatering by lowering the filter press 5 can be seen in FIGS. 12 and 18. After the steam valves have been closed, the pressure cylinders 34 are switched by pressure control to their maximum pressing force, in order to accelerate the absorption of heat in the granular lignite 6 and to speed the dewatering. After the filter press 5 has been withdrawn by means of the long-stroke cylinder 34, the dewatered coal slab 31 as an end product is conveyed out of the press 5 and delivered to the collector or collecting bunker 39 in area C for further processing.

In conclusion, the present invention provides a process, device and press for reducing the water content, bound by capillarity in fiber cells, of pulverized solid carboniferous materials and/or sludges, especially raw lignite, effected by thermal energy and pressure on the input material to be dewatered, the thermal energy consisting of superheated water vapor and the mechanical energy being supplied and applied as surface pressure on the input material in pressure spaces, characterized by a combination of the following process stages, so that a) an input material preheated to approximately 60° Celsius is used, which at the beginning of the operating time is steamed from both sides in an essentially vaportight closed pressure chamber preheated to over 100° Celsius and with water vapor superheated up to ≧150° Celsius, whereby
b) the compressive pressure on the input material is equivalent to ≧ the pressure existing in the input material because of the piling density, to a maximum of approximately 5 bar to 8 bar in the introduced steam pressure, and
c) after a temperature of approximately ≧125° Celsius is reached in the input material, the injection steaming is terminated and, depending on the granular size, a high mechanical specific pressure in the press comes into effect, up to a maximum of 75 bar for reduction to a residual water content of up to 20 percent by weight. Another aspect of the invention provides a device for reduction of the water content, bound by capillarity in fiber cells, of pulverized solid carboniferous materials and/or sludges, especially raw lignite, effected by thermal energy and pressure on the input material to be dewatered, the thermal energy consisting of superheated water vapor and the mechanical energy being supplied and applied as surface pressure on the input material in pressure spaces, for executing the process especially described above, characterized in that the main components of the device are a dispersion machine (3), a heatable filter press and a dispersion box belt system (1) with a rectangular dispersal section for the granulated lignite, in which the endless dispersion belt (4) with two endless lateral steel belts (8) is made to revolve through a gastight sealable pressure chamber (40) in the press (9) and in which, transversely to the line of travel, at the entry and exit (26 and 27) of the pressure chamber (40) the chamber can be closed and opened by a blade (22) which can be applied and removed and a gate valve (28).

Yet another aspect of the invention provides a press for reducing of the water content, bound by capillarity in fiber cells, of pulverized solid carboniferous materials and/or sludges, especially raw lignite, effected by thermal energy and pressure on the input material to be dewatered, the thermal energy consisting of superheated water vapor and the mechanical energy being supplied and applied as surface pressure on the input material in pressure spaces, for executing the process especially as described above characterized that the rectangular pressure chamber (40) consists of a stationary lower pressure plate (13) and five hydraulically movable chamber walls, the two lateral pressure strips (19) being supported vertically against the longitudinal sides of the pressure plate (13) and capable of being pressed with variable force against the smooth longitudinal sides of the upper pressure plate (17) and the gate valve (28) and blade (22) which can be applied and removed separate the exit (27) and entry (26) and the upper pressure plate (17) between the vertical chamber walls (19, 22 and 28) controls hydraulically the compressive pressure for the processing sequence of steam injection and mechanical pressing by means of the pressure cylinder (34).

Another aspect of the invention provides a press as described above, charaterized in that the forces working on all five walls of the pressure chamber (17, 19, 22 and 28) are cushioned by the press frames enclosing the pressure chamber (40).

A further aspect of the invention provides a press described above, characterized in that all six walls (13, 17, 19, 22, 28) of the pressure chamber can be heated to a temperature of ≧ of 100° Celsius.

Another aspect of the invention provides a press as described above characterized in that all the surfaces of the pressure chamber walls (13, 17, 19, 22, 28) support one another and are sealed gastight with thermally stable elastic rubber gaskets (21, 29, 41 and 42).

Another aspect of the invention provides a press as described above characterized in that, in the lower and upper pressure plate (13 and 17), three horizontal support rollers (14, 15, 16) forming a collector and distributor area for the injection steaming (15), the heating (14) in the center of the slab (13 and 14) and for catching the escaping water are located near the opposite side of the pressure surface, the steam vents (15) being distributed over the entire pressure surface in a grid at distances of approximately 90 mm and the water drain holes (16) being distributed with a gap, their grid measurements being the same.

Another aspect of the invention provides a press as described above characterized in that the dispersion belt (4) is a woven metal belt with a mesh smaller than the finest granular particle or sludge particle of the input material (6), generally ≦0.5 mm.

Another aspect of the invention provides a press as described above characterized in that the filter sieve (18) on the upper pressure plate consists of the same woven metal as the lower dispersion belt (4).

Another aspect of the invention provides a press as described above characterized in that the upper pressure plate (17) is so formed along the lateral pressure strips (19) that the vertical steel belts (8) can move smoothly between the smooth outer surfaces of the edges of the pressure plate (17) and the smooth inner surfaces of the lateral pressure strips (19).

Another aspect of the invention provides a press as described above characterized in that the blade (22) at the entry (26) of the press (5) is led and clamped flexibly between the two vertical steel belts (8) and the two lateral pressure strips (19) and the depth of penetration over the entire piling height (H) is controlled by pressure or its position is secured.

Another aspect of the invention provides a press as described above characterized in that the gate valve (28) is led and clamped flexibly between the two vertical steel belts (8) and during the pressing stage is pressed tight against the upper edge of the dewatered coal slab (31) and can be lifted hydraulically after the pressing stage out of the steam and press chamber zone so that the press (5) can be emptied.

Another aspect of the invention provides a press as described above characterized in that, in the dispersion segment (A) zone the lower dispersion machine belt (4) and the vertical steel belts between the support rollers and idler rollers (9 and 11) can be heated by sliding heat conducting plates (12) centered in the steel belts (4).

A further embodiment of the invention provides a device as described above characterized in that the lower dispersion belt (4) and the vertically placed steel belts (8) are set synchronously in the sequence of movement of the drives assigned to them.

A further embodiment of the invention provides a device as described above characterized in that the lower dispersion belt (4) and the two steel belts (8) are over the entire length of the dispersion segment (A) and the pressure chamber segment (B) disposed endlessly in the return travel below the press (5) and so that they return on the side exterior to the press (5) and the dispersion segment.

A further embodiment of the invention provides a device as described above characterized in that the distributor rollers (38) for transverse distribution of the dispersed material (6) and the entry hopper are heated.

A further embodiment of the invention provides a device as described above characterized in that the dispersion machine (3) distributes the granular lignite over the dispersion segment (A) in one or more longitudinal movements (6) by means of one or more distributor rollers (38) transversely between the steel belts (8) running vertically to the dispersion belt (4) to a surface bed up to the dispersal height (H).

A further embodiment of the invention provides a device as described above characterized in that the reversing dispersion machine (3) is supplied from a central bunker system (1) by a reversing delivery belt (2) above the dispersion segment (A) and the press (5).

A further embodiment of the invention provides a device as described above characterized that the delivery belt (2) is heated over the entire dispersion segment.

While particular embodiments according to the invention have been illustrated and described above, it will be clear that the invention can take a variety of forms and embodiments within the scope of the appended claims.

Priority application 195 35 315.3 filed Sept. 22, 1995 in the Federal Republic of Germany is hereby incorporated by reference.

I claim:

1. A system for dewatering materials, comprising:

a belt onto which the materials are dispersed, the belt having a lower belt which is permeable to steam and two sidewall belts which are impermeable to gas, the two sidewall belts being coupled to the lower belt through a pair of sealing strips; and a press through which the belt is conveyed, the press having a lower plate over which the belt is conveyed, the lower plate having a plurality of holes through which steam is injected and through which water is drained.

2. A system as recited in claim 1, further comprising a plurality of heat conduction plates over which the belt is conveyed before the belt is conveyed through the press.

3. A system as recited in claim 1, wherein the press further includes an upper plate, wherein a pressing force is applied to the materials as the upper plate moves closer to the lower plate.

4. A system as recited in claim 3, wherein the lower plate further includes a plurality of heating holes.

5. A system as recited in claim 4, wherein the press further includes lateral plates against which the sidewall belts are slidably disposed and hydraulic cylinders for applying lateral pressure to the lateral plates against the sidewall belts and the sidewall belts against the upper plate.

6. A system as recited in claim 5, wherein the press further includes additional hydraulic cylinders for applying vertical pressure to the lateral plates against the sealing strips of the lower belt and the lower plate.

7. A system as recited in claim 6, further comprising gaskets disposed between the lateral plates and the sealing strips of the lower belt and between the lateral plates and the upper plate.

8. A system as recited in claim 7, wherein the gaskets comprise thermally stable elastic rubber gaskets.

9. A system as recited in claim 4, wherein the press further includes a hydraulic press cylinder coupled to the upper plate for selectively raising and lowering the upper plate with respect to the lower plate.

10. A system as recited in claim 3, wherein the press further includes a filter sieve which is disposed beneath the upper plate and which comprises a woven metal with a mesh smaller than the finest particle in the materials.

11. A system as recited in claim 1, further comprising a sleeve regulating a flow of materials conveyed through the press, and a valve regulating a flow of the materials exiting the press.

12. A system as recited in claim 1, further comprising a gastight pressure chamber to which the materials are conveyed, the chamber defined by the lower plate, a pair of vertical lateral pressure strips against which the two sidewall belts slide, an upper plate selectively lowered and raised by the press, a sleeve regulating a flow of materials entering the chamber, and a valve regulating a flow of the materials exiting the chamber.

13. A system as recited in claim 1, the lower belt comprises a woven metal belt with a mesh smaller than the finest particle in the materials.

14. A thermomechanical dewatering system for producing a dewatered slab, comprising:

a belt for supplying materials to be dewatered, the belt having a lower belt, two sidewall belts, and a pair of gaskets which couples the sidewall belts to the lower belt; and a gastight pressure chamber to which the materials are supplied by the belt, the chamber including a lower plate on top of which the lower belt slides, lateral pressure strips against which the two sidewall belts slide, a sleeve regulating a flow of materials entering the chamber, a valve regulating a flow of the materials exiting the chamber, and an upper plate disposed between the lateral pressure strips.

15. A system as recited in claim 14, further comprising hydraulic press cylinders coupled to the upper plate for selectively raising and lowering the upper plate with respect to the lower plate.

16. A system as recited in claim 15, further comprising hydraulic cylinders for applying lateral pressure to the lateral pressure strips against the sidewall belts and the sidewall belts against the upper plate.

17. A system as recited in claim 16, further comprising additional hydraulic cylinders for applying vertical pressure to the lateral pressure strips against the sealing strips of the lower belt and the lower plate.

18. A system as recited in claim 17, further comprising gaskets disposed between the lateral plates and the sealing strips of the lower belt and between the lateral plates and the upper plate.

19. A system as recited in claim 17, further comprising a hydraulic press cylinder coupled to each of the sleeve and the valve for selectively lowering and raising.

20. A system as recited in claim 19, wherein the sleeve is clamped flexibly between the two sidewall belts and the lateral plates and penetrates into the materials only partially.

21. A system as recited in claim 19, wherein the valve is clamped flexibly between the two vertical steel belts and, wherein, when the upper plate is lowered, the valve is lowered to press tightly against an upper edge of the dewatered slab and, when the upper plate is raised, the valve is raised so the dewatered slab can be emptied.

22. A method for dewatering materials, comprising the steps of:

continuously dispersing materials into a dispersion box belt;

introducing the materials dispersed into the dispersion box belt through a pressure chamber;

precompressing the materials introduced into the pressure chamber; and uniformly injecting steam having a steam pressure in a range of 5 bar to 8 bar through the materials introduced into the pressure chamber.

23. A method as recited in claim 22, wherein the step of precompressing includes the steps of:

conveying the dispersion box belt onto a lower plate of a press; and lowering an upper plate of the press to a height H, wherein the height H is approximately equal to a desired height of the materials dispersed into the dispersion box belt.

24. A method as recited in claim 22, further comprising the steps of:

collecting water from the pressure chamber;

sealing the pressure chamber steamtight; and mechanically pressurizing the pressure chamber.

25. A method as recited in claim 24, further comprising the steps of:

preheating the materials; and heating the materials as the materials are conveyed to the pressure chamber.

26. A method as recited in claim 24, wherein the step of sealing includes the steps of:

lowering an exit valve of the pressure chamber;

lowering an entrance sleeve of the pressure chamber; and applying lateral pressure against sidewalls of the pressure chamber.

27. A method as recited in claim 26, wherein the step of mechanically pressurizing includes:

conveying the dispersion box belt onto a lower plate of a press; and lowering an upper plate of the press.

28. A method for reducing a water content which is bound by capillarity in fiber cells of pulverized solid carboniferous materials, the materials being conveyed by a dispersion box which is introduced into a pressure chamber including upper and lower plates, said method comprising the steps of:

preheating the materials to approximately 60° C. and the dispersion box to approximately 100° C.;

applying steam to the materials introduced into the pressure chamber;

exerting a pressure in the chamber no greater than steam pressure in the step of applying steam; and sealing the pressure chamber to be gastight and raising pressure in the pressure chamber by pressing the materials between the upper and lower plates.

29. A method as recited in claim 28, further comprising the step of heating the materials up to about 125° C. during the step of applying steam.

30. A method as recited in claim 28, wherein the step of applying steam includes injecting steam from both the upper and lower plates.

31. A method as recited in claim 28, wherein the step of raising the pressure in the pressure chamber includes raising the pressure to 75 bar.

32. A method as recited in claim 28, wherein after the sealing and raising steps, the water content of the materials is reduced to 20 percent by weight.

33. A method for reducing water content of materials by applying thermal energy and mechanical energy to the materials inside a substantially vapor-tight pressure chamber, the thermal energy including superheated steam and the mechanical energy including compression pressure, said method comprising the steps of:

introducing the materials into the pressure chamber;

treating the materials with injected steam superheated to a temperature ≧150° C. to heat the materials to a temperature above 100° C.;

applying pressure on the materials, the pressure corresponding to a pressure between 5 bar and 8 bar, and after a temperature of approximately 125° C. is reached in the materials, stopping the injecting of the steam and increasing the pressure on the materials up to a maximum pressure that is determined in accordance with a grain size of the materials.

34. A method as recited in claim 33, wherein the pressure is increased to no greater than 75 bar.

35. A method as recited in claim 33, wherein the residual water content of the materials is reduced 20% by weight.

36. A method as recited in claim 33, wherein the materials introduced into the pressure chamber are preheated to a temperature up to 60° C.

* * * * *